US006923613B2

(12) United States Patent
Stuyt

(10) Patent No.: US 6,923,613 B2
(45) Date of Patent: Aug. 2, 2005

(54) MANIPULATOR

(76) Inventor: Henricus Johannes Adrianus Stuyt, Ebenseweg 3a, 6915 Lobith KA (NL)

( * ) Notice: Subject to any disclaimer, the term of this patent is extended or adjusted under 35 U.S.C. 154(b) by 0 days.

(21) Appl. No.: 09/847,696

(22) Filed: May 2, 2001

(65) Prior Publication Data

US 2002/0006327 A1 Jan. 17, 2002

Related U.S. Application Data

(63) Continuation of application No. PCT/NL99/00670, filed on Oct. 29, 1999.

(30) Foreign Application Priority Data

Nov. 2, 1998 (NL) .......................................... NL 101446

(51) Int. Cl.[7] .............................................. B66C 23/00
(52) U.S. Cl. ...................... 414/719; 414/729; 414/735; 901/15; 901/21; 901/23; 901/25; 901/26; 901/48
(58) Field of Search ................................ 414/729, 719, 414/735; 901/48, 15, 21, 23, 25, 26, 29

(56) References Cited

U.S. PATENT DOCUMENTS

| 3,262,593 | A | * | 7/1966 | Hainer ........................ 214/651 |
| 3,922,930 | A | * | 12/1975 | Fletcher et al. .............. 414/738 |
| 4,221,516 | A | * | 9/1980 | Haaker et al. .................. 414/5 |
| 4,803,895 | A | * | 2/1989 | Nishizawa et al. .......... 414/735 |
| 4,854,808 | A | * | 8/1989 | Bruno .......................... 414/680 |
| 4,888,877 | A | * | 12/1989 | Enderle et al. ................ 33/559 |
| 4,984,959 | A | * | 1/1991 | Kato ........................ 414/744.3 |
| 5,577,414 | A | * | 11/1996 | Ogawa et al. ............ 74/490.03 |
| 5,661,387 | A | * | 8/1997 | Stadele et al. .......... 318/568.11 |
| 5,746,093 | A | * | 5/1998 | Poglitsch ................. 74/490.05 |
| 5,816,770 | A | * | 10/1998 | Itagaki ..................... 414/744.5 |
| 5,901,613 | A | * | 5/1999 | Forslund .................. 74/490.03 |
| 5,982,127 | A | * | 11/1999 | Matsubara et al. ..... 318/568.11 |
| 6,068,442 | A | * | 5/2000 | Flemmer et al. .......... 414/744.5 |

FOREIGN PATENT DOCUMENTS

| DE | 3504233 A1 | * | 11/1986 | ............ B25J/17/02 |
| DE | 3734179 A1 | * | 4/1989 | ............ B25J/17/00 |
| FR | 2608959 A1 | * | 7/1988 | ............ B25J/19/00 |
| WO | WO 84/01740 | * | 5/1984 | ............ B25J/9/00 |
| WO | WO 92/05016 | | 4/1992 | |
| WO | WO 96/08345 | | 3/1996 | |

* cited by examiner

Primary Examiner—Eileen D. Lillis
Assistant Examiner—Michael Lowe
(74) Attorney, Agent, or Firm—Banner & Witcoff, Ltd.

(57) ABSTRACT

A manipulator is provided that includes a foot part and a number of members connected to the foot part and to each other respectively, and at least a gripper part, such that the members, the gripper and the foot part form an arm. One or more motors are provided in the foot part for moving at least a one of the members and the gripper.

62 Claims, 11 Drawing Sheets

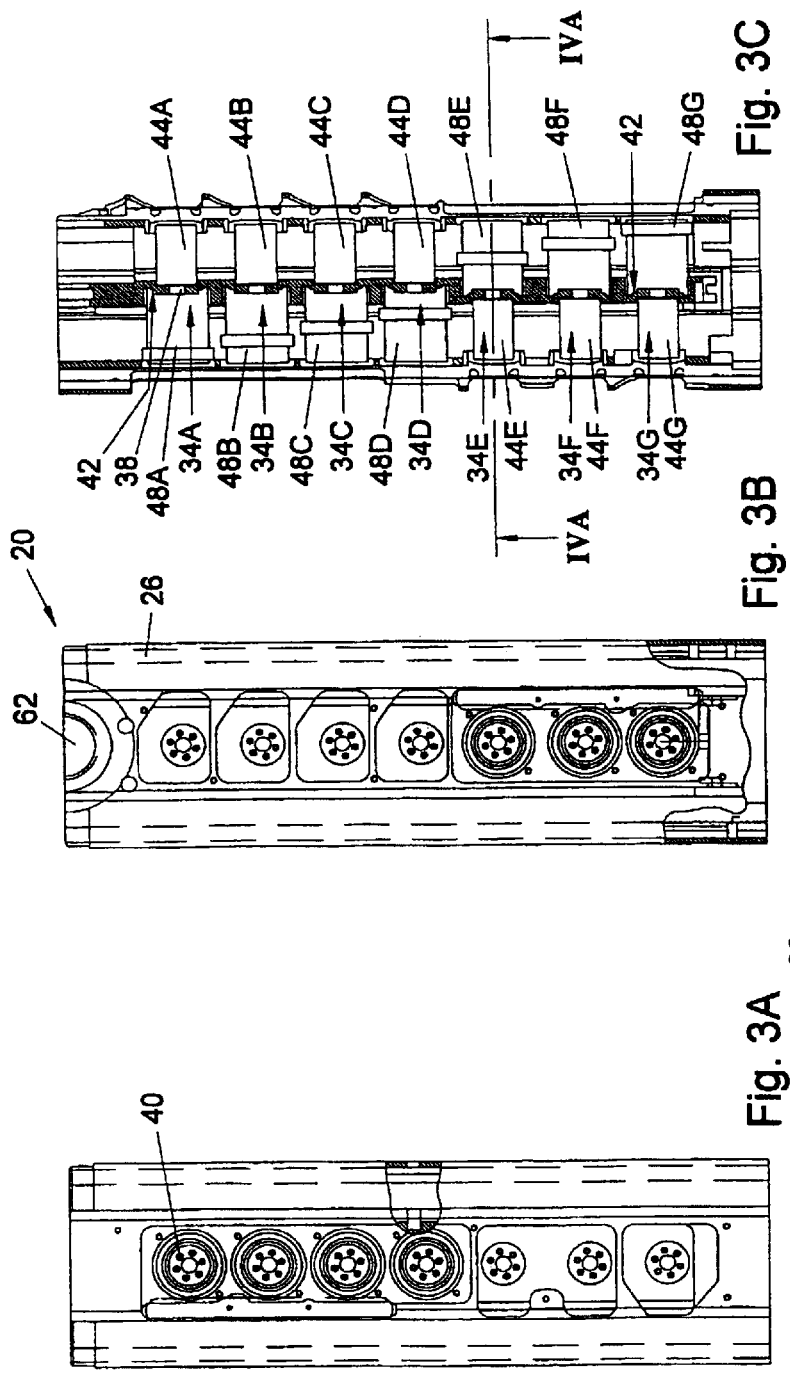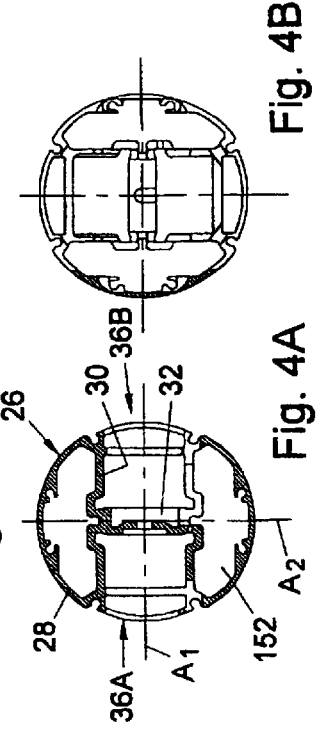

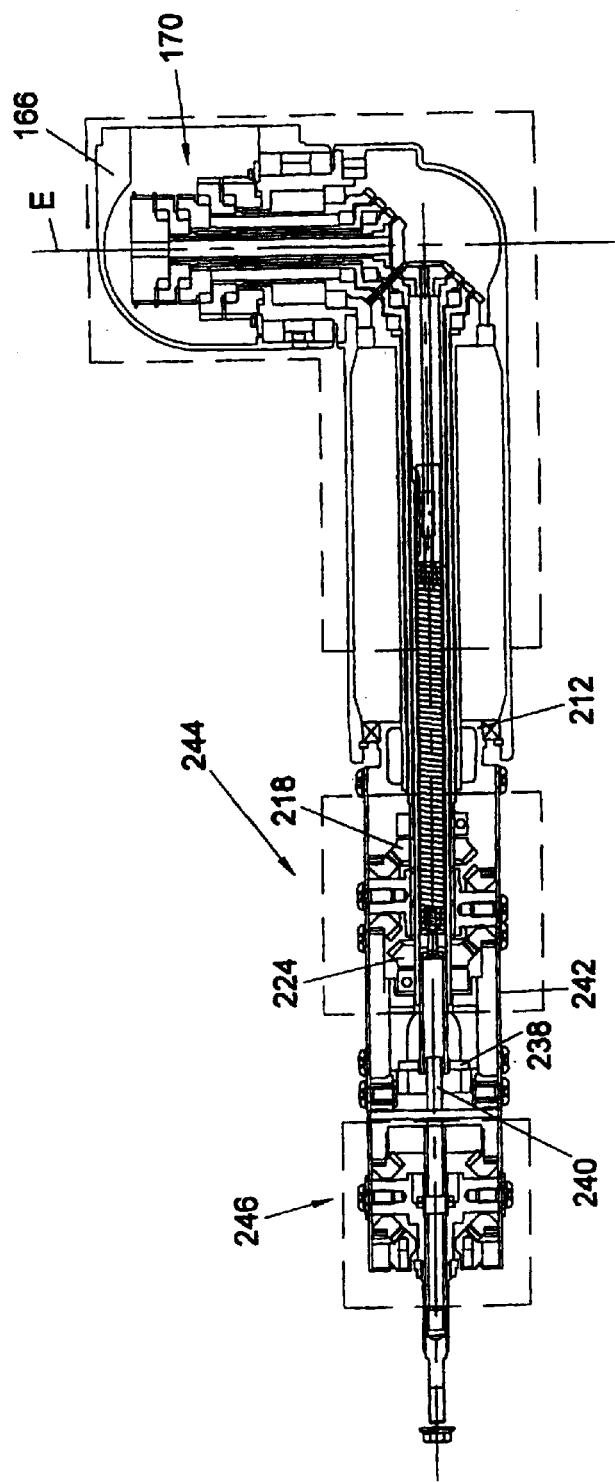
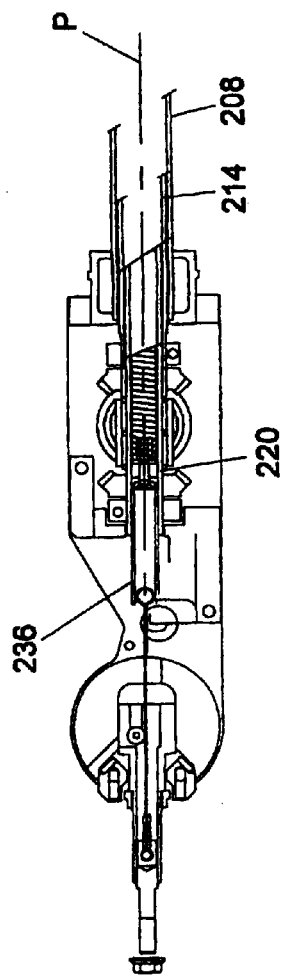
Fig. 7A
Fig. 7B

MANIPULATOR

This application is a continuation of prior application No. PCT/NL99/00670, filed Oct. 29, 1999; which claims priority from Dutch Patent Application No. NL 1010446, filed Nov. 2, 1998.

The invention relates to a manipulator, in particular a manipulator having at least a number of members, of which one member is gripper-shaped. In this context, gripper-shaped should be understood to mean being formed in such manner that objects can thereby be engaged, processed or manipulated otherwise. Such manipulators are known from practice.

Known manipulators, such as industrial robots, comprise, for instance, a foot part on which a first member is movably mounted in a first pivot point, a second member connected to the first member in a second pivot point, and a third member connected to the second member in a third pivot point. Each pivot point is provided with at least a motor for moving one of the members relative to the other member mounted in the relevant pivot point. Thus, for instance, the first pivot point can define a rotary shaft for rotation of the first member about its longitudinal axis relative to the foot part which is usually of plate-shaped design, the second pivot point can comprise a pivotal shaft extending at right angles to the longitudinal direction of both the first and the second member to allow pivoting of the second member relative to the first member, while the third pivot point again defines a rotary shaft parallel to the longitudinal direction of the second member, to enable pivoting of the third member relative to the second member. Moreover, in the third pivot, a second pivotal shaft may further be provided, at right angles to the longitudinal axis of the second member, to allow the third member to pivot relative to the second member. In such manipulator, each pivotal or rotary shaft is provided with a motor. Moreover, there is provided another motor for opening and closing a gripper on the third member. When the manipulator is stretched, the first, second and third members are in line. The drawback of such manipulator is that the arm formed by the first, second and third members is relatively heavy, due to, in particular, the motors. Moreover, the freedom of movement of such robot arm is limited. The gripper of such manipulator can only cover a limited area around the foot part and can, for instance, not approach the foot part itself in that the different members will strike against each other and limit the pivoting angle to considerably less than 360°. A further drawback of such manipulator is that the arm is relatively vulnerable, in particular the motors, while it is moreover maintenance-prone, in particular in that the electric cabling for the motors extends through the arm. This, too, limits the freedom of movement of the manipulator. A further drawback of such manipulator is that it can ill be used in an environment where, for instance, strong radiation prevails, as such radiation will have an effect on the behavior of the motors and on the cabling. Shielding the motors and the cabling against such radiation has the drawback that, as a consequence, the arm becomes heavier and more voluminous, which limits the possibilities of use for such manipulator even further.

The object of the invention is to provide a manipulator of the type described in the preamble, wherein the drawbacks mentioned are avoided, while the advantages thereof are maintained. To that end, a manipulator according to the invention is characterized by the features of claim 1.

Because in a manipulator according to the present invention, the drive means, in particular the motors, are at least substantially accommodated in the foot part, the arm may be of relatively light and slender design, while the motors and the associated cabling, accommodated in the foot part, can be shielded relatively easily. As a result, a manipulator according to the invention can easily be of robust design and be used in all kinds of environments. Moreover, the freedom of movement of a gripper of a manipulator according to the invention can easily have a particularly great range. The arm of a manipulator according to the invention can relatively easily be of light design, to obtain, with relatively light motors, a relatively great power and/or high speeds of movement and a great precision, which adds to the positional accuracy of the gripper. A manipulator according to the present invention can easily have any desired number of degrees of freedom, while the gripper may be designed in any desired manner.

The use of compensating means for reducing, at least compensating for the moment exerted by the arm, in particular the upper arm and the lower arm relative to the foot part, offers the advantage that the arm of the manipulator can be set and retained in almost any position by means of relatively light drive means, also when the gripper is loaded. Preferably, the compensating means are of such design that the arm, in particular the upper arm and lower arm, is approximately kept in balance in almost any position by the compensating means. The advantage thus achieved is that relatively light drive means can be used, that positioning can be effected in a fast and accurate manner and, moreover, that a relatively high load on the arm is possible, in spite of a relatively light construction of the manipulator.

The advantage achieved by the use of eccentrics coupled to rotary shafts of the members, in particular the upper arm and lower arm, with the provision of spring means coupled to the relevant eccentrics, is that a relatively compact construction is possible, while the spring means can be of simple and relatively light design and can nevertheless produce sufficient force for compensation within the compensating means. By designing the spring means as tension springs accommodated in the foot part, the advantage achieved is that the spring means are concealed in a safe and attractive manner without limiting the freedom of movement of the manipulator. Of course, other spring means, such as compression springs or torsion springs or combinations of such spring means, may be used as well. Through the use of band-shaped elements which are connected on one side to a positionally fixed point and on the other to a relevant spring, which band means extend over the relevant eccentrics, the advantage achieved is that a relatively simple construction is obtained which is robust and reliable in operation. Rotation of the relevant shafts results in rotation of the eccentrics, causing the band-shaped elements to move while changing the spring length. The tension in the band elements and the friction between the band elements and the eccentrics provide that the position of the lower arm and upper arm respectively is retained.

Preferably, in a manipulator according to the present invention, each drive means comprises a motor coupled to a reduction casing aligned therewith, which reduction casing is connected to a drive wheel for driving a shaft which drives a part of the arm. Thus, the motors and reduction casings can be manufactured in a relatively inexpensive and compact manner, so that relatively little space is required in the foot part for accommodating the drive means. The reduction casings are preferably mutually identical, while the drive wheels differ only in position relative to the motors, so that the motors and reduction casings can be of an even simpler and cheaper design.

The advantage achieved through the use of first and second drive shafts, fitted one within the other, is that a relatively large number of drive shafts can be incorporated into a relatively small space, while rotation of the different shafts independently of each other is possible in a relatively simple manner. Thus, compact packs of shafts are obtained. By intercoupling the first and second drive wheels of associated first and second drive shafts, for instance utilizing gears and further shafts or geared belts, a rotary movement can thereby readily be imposed on each shaft by means of the drive means accommodated in the foot part for moving the gripper in one of the six degrees of freedom and/or for opening and closing the gripper.

The wrist offers the advantage that the freedom of movement of the gripper is increased even further. The use of a spring element extending in longitudinal direction of the adjoining member, in particular the lower arm, for operating the gripper, in particular when a gripper having a number of fingers that are movable relative to each other is used, offers the advantage that the gripper can relatively easily be pulled from the biased, open position into a closed position and vice versa, while the spring element offers the advantage that unduly great closing forces can readily be prevented. After all, the spring element will compensate for unduly great closing forces, if any, by elastic deformation.

The advantage achieved by providing the foot part with a foot plate which is rotatably bearing-mounted adjacent the lower end of the foot part is that the foot part, and accordingly the arm, can rotate about the longitudinal axis of the foot part, whereby the freedom of movement of the gripper can be increased even further in a simple manner. Moreover, the advantage achieved through the use of sliding contacts for transmitting electric tension between the drive means and a voltage source located outside the foot part, such as, for instance, a control unit, is that such rotation is readily possible over a particularly great angle, possibly even over N×360°. Thus, the foot part functions as an additional member.

By designing the foot part of the manipulator, at least a housing thereof, substantially as an extruded tubular section, with the provision of recesses for the drive means, such foot part can be manufactured in a particularly simple and inexpensive manner, while the construction of the foot part is nevertheless strong. Preferably, spaces are included in the relevant extrusion section, into which spaces, for instance, spring means for compensating means and electronic control and regulating means can be inserted, which are thus readily guarded with respect to the environment.

To clarify the invention, an exemplary embodiment of a manipulator will hereinafter be described with reference to the accompanying drawings. In these drawings:

FIG. 1 schematically shows a manipulator according to the present invention, coupled to a control unit;

FIGS. 3A–3C are, in partially sectional condition, a front view, side elevation and rear view respectively of a foot part;

Figure 5:
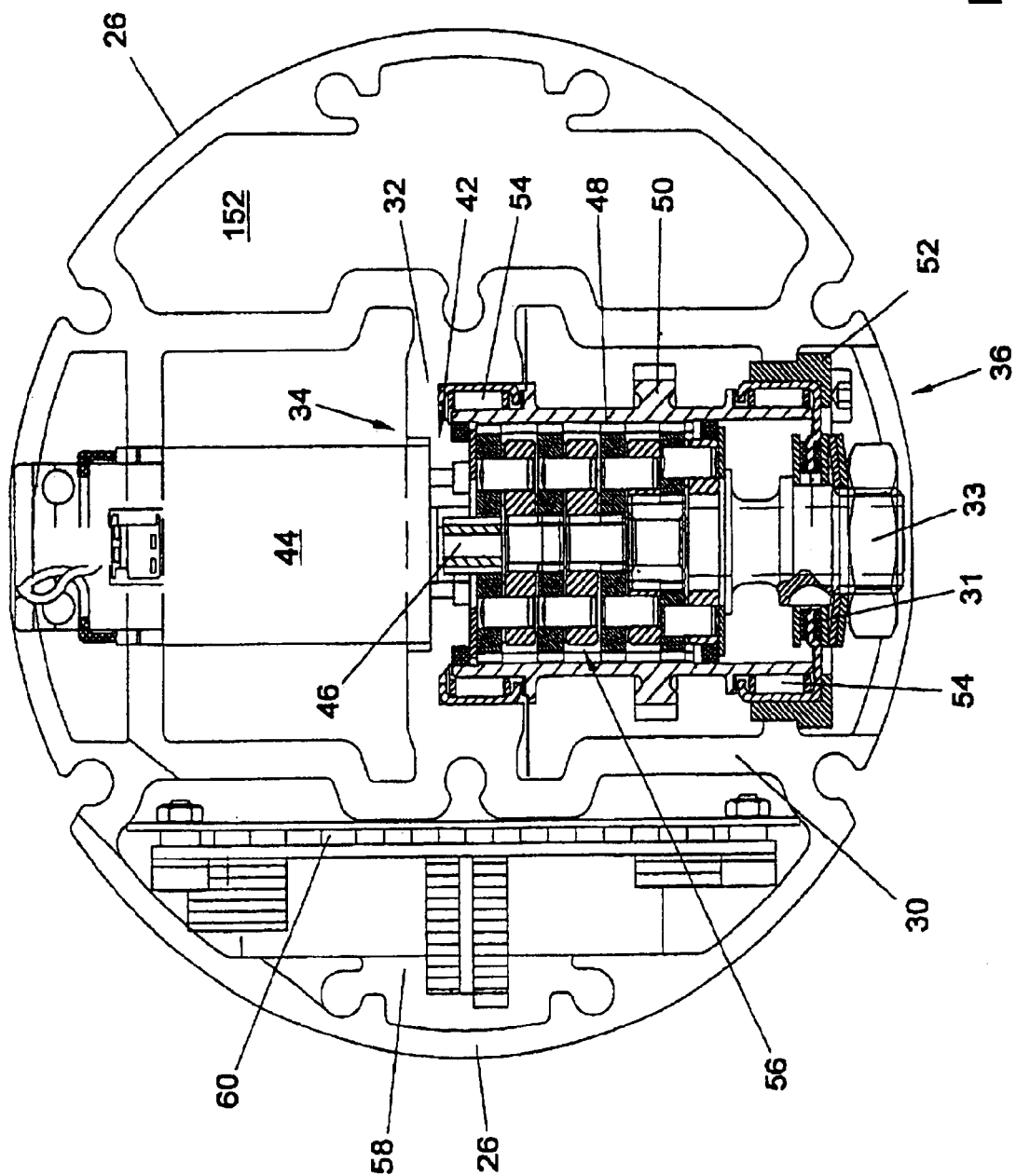
Figure 6:
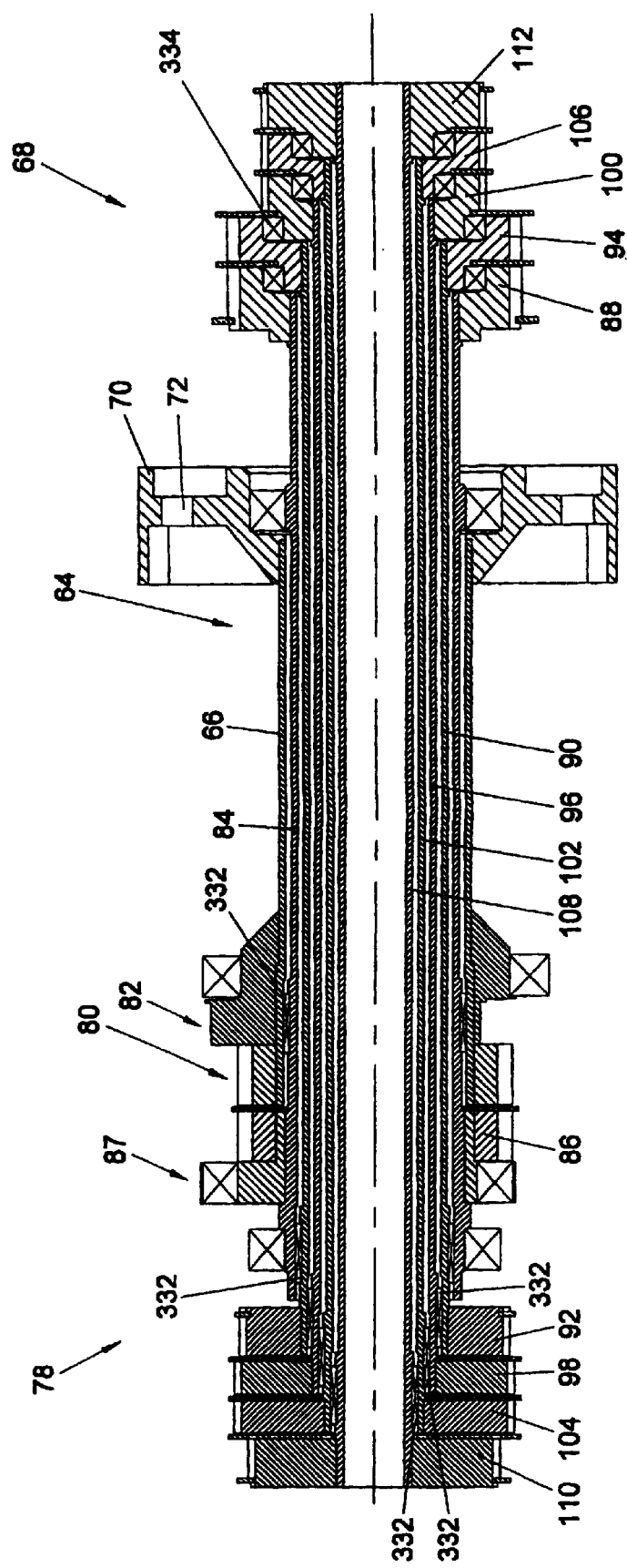
Figure 6A:
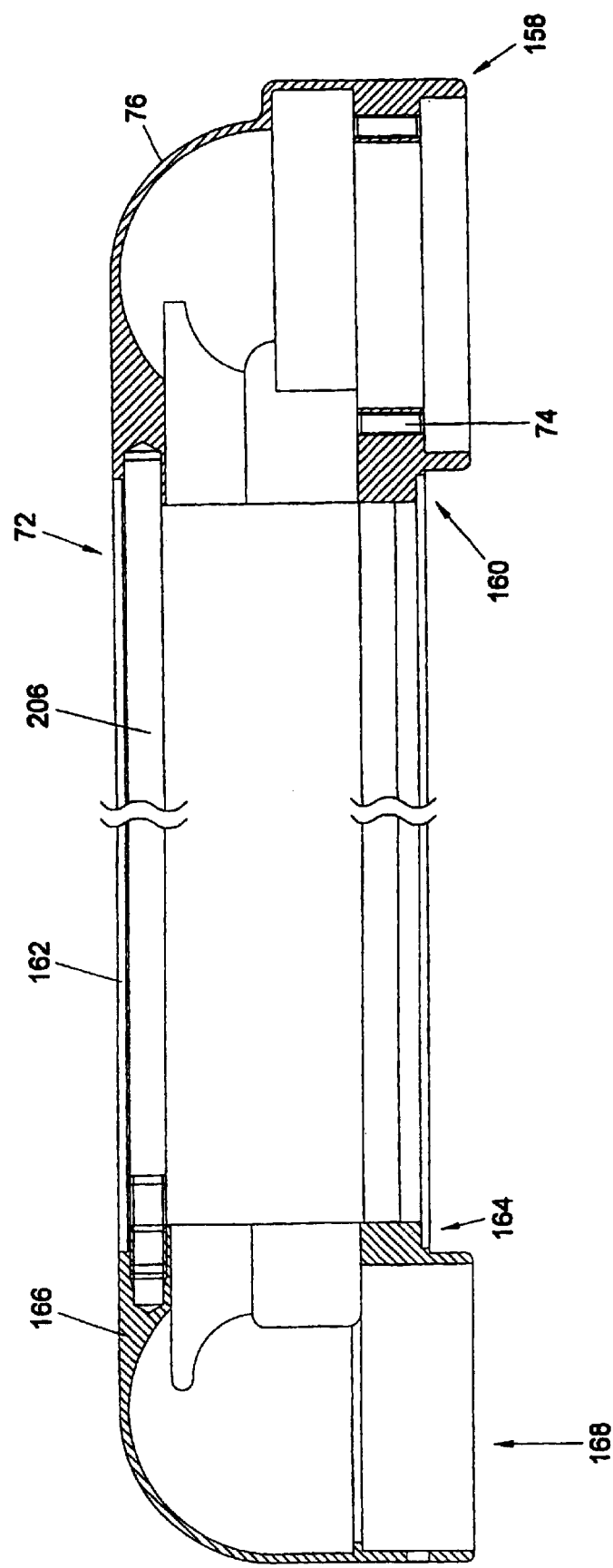
Figure 7C:
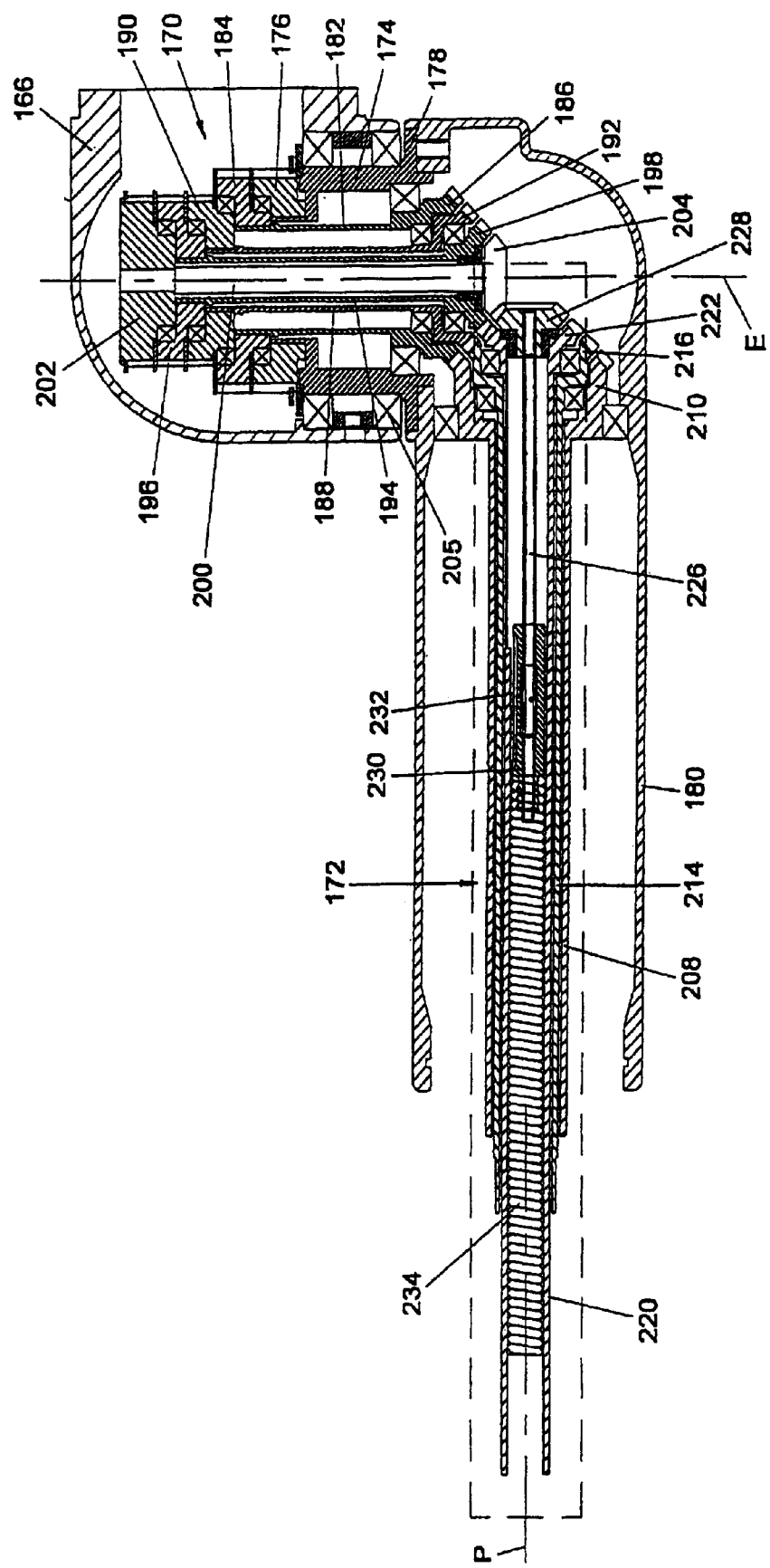
Figure 8:
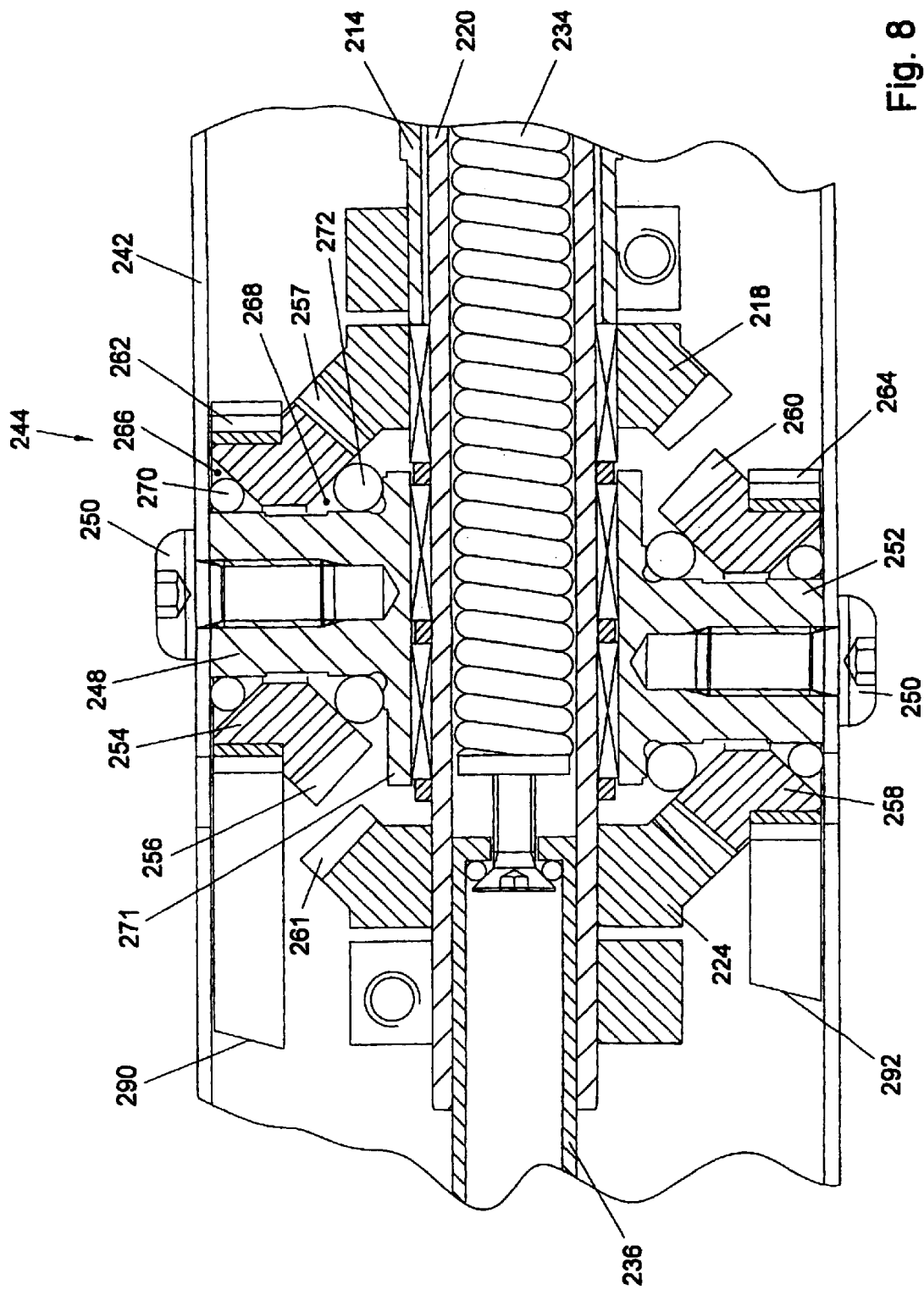
Figure 9:
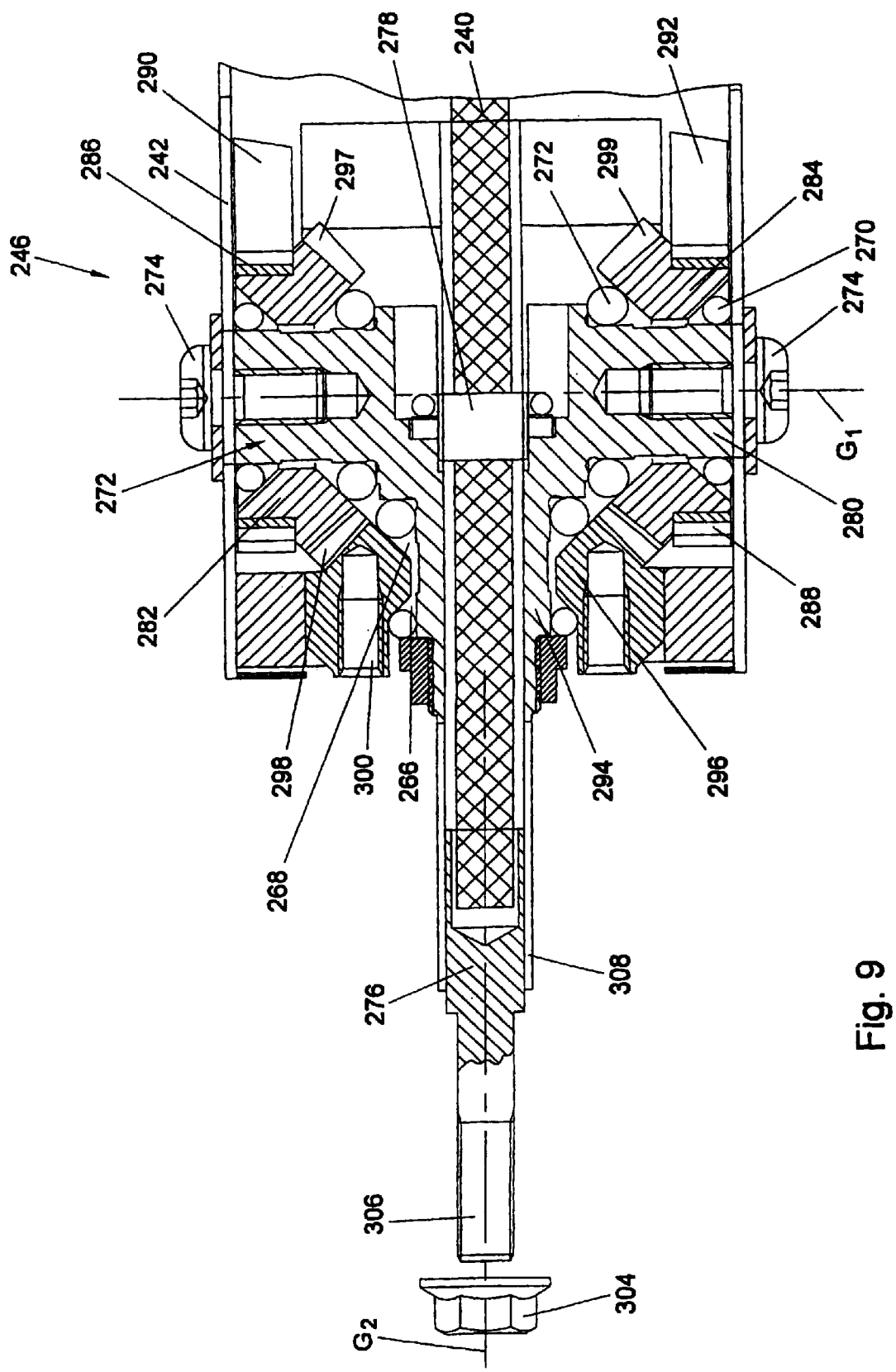

FIGS. 4A and B are two horizontal sections of a foot part according to FIG. 3;

FIG. 5 is a top plan view of a foot part according to the invention;

FIG. 6 shows, in cross section, a pack of shafts for a shoulder axis;

FIG. 6A is a schematic, sectional side elevation of a housing for an upper arm;

FIG. 7A is a sectional side elevation of a lower arm, wrist, gripper axis and pack of shafts for the elbow axis of a manipulator according to the invention;

FIG. 7B is a view at right angles to the view of FIG. 7A of a wrist;

FIG. 7C is in more detail the view according to FIG. 7B with lower arm section;

FIG. 8 is an enlarged sectional view of a first part of a wrist joint;

FIG. 9 is an enlarged sectional view of a second part of a wrist joint; and

Figure 10:
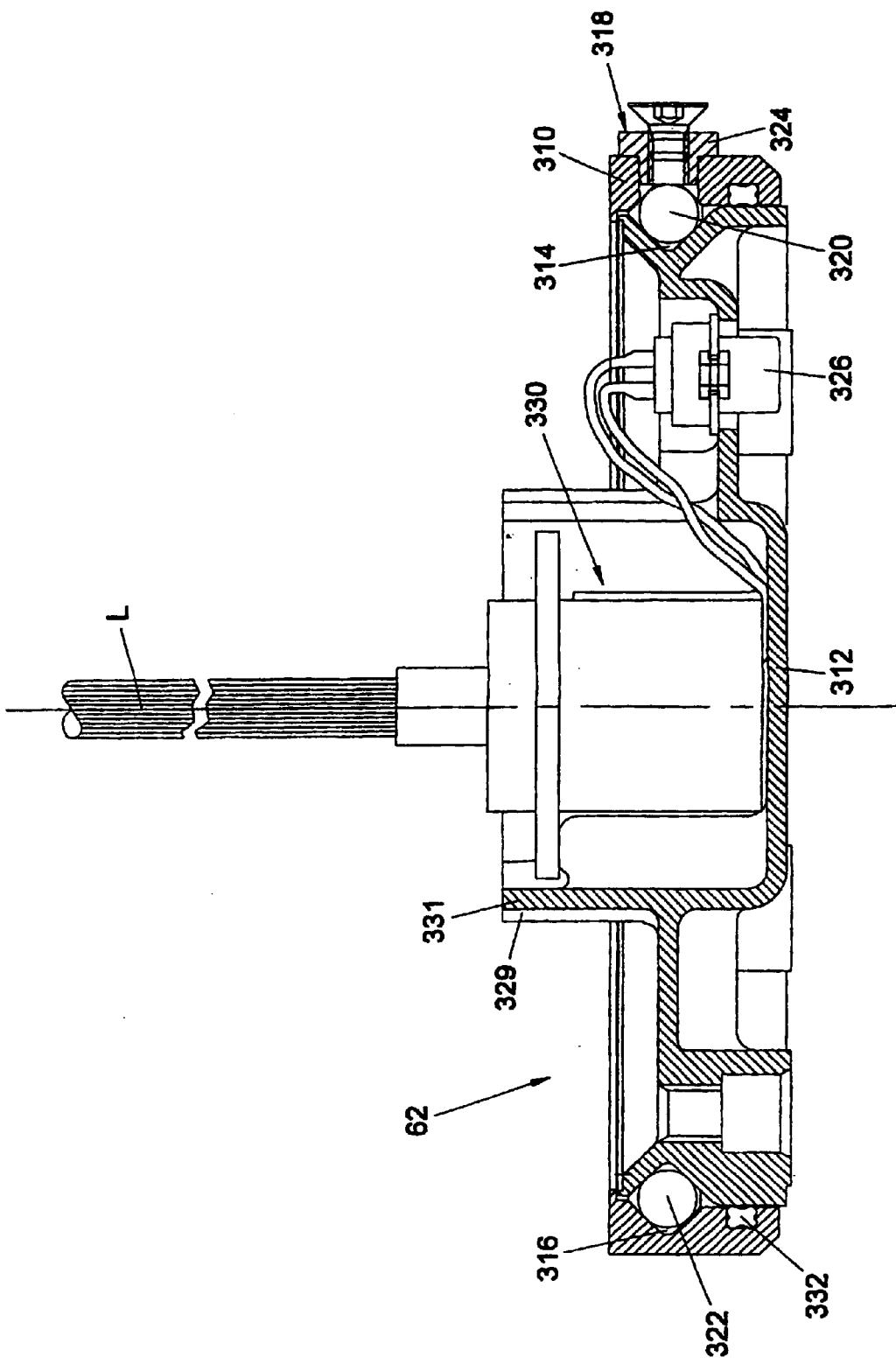

FIG. 10 is a sectional side elevation of a foot plate for a part of a manipulator according to the invention.

Figure 1:
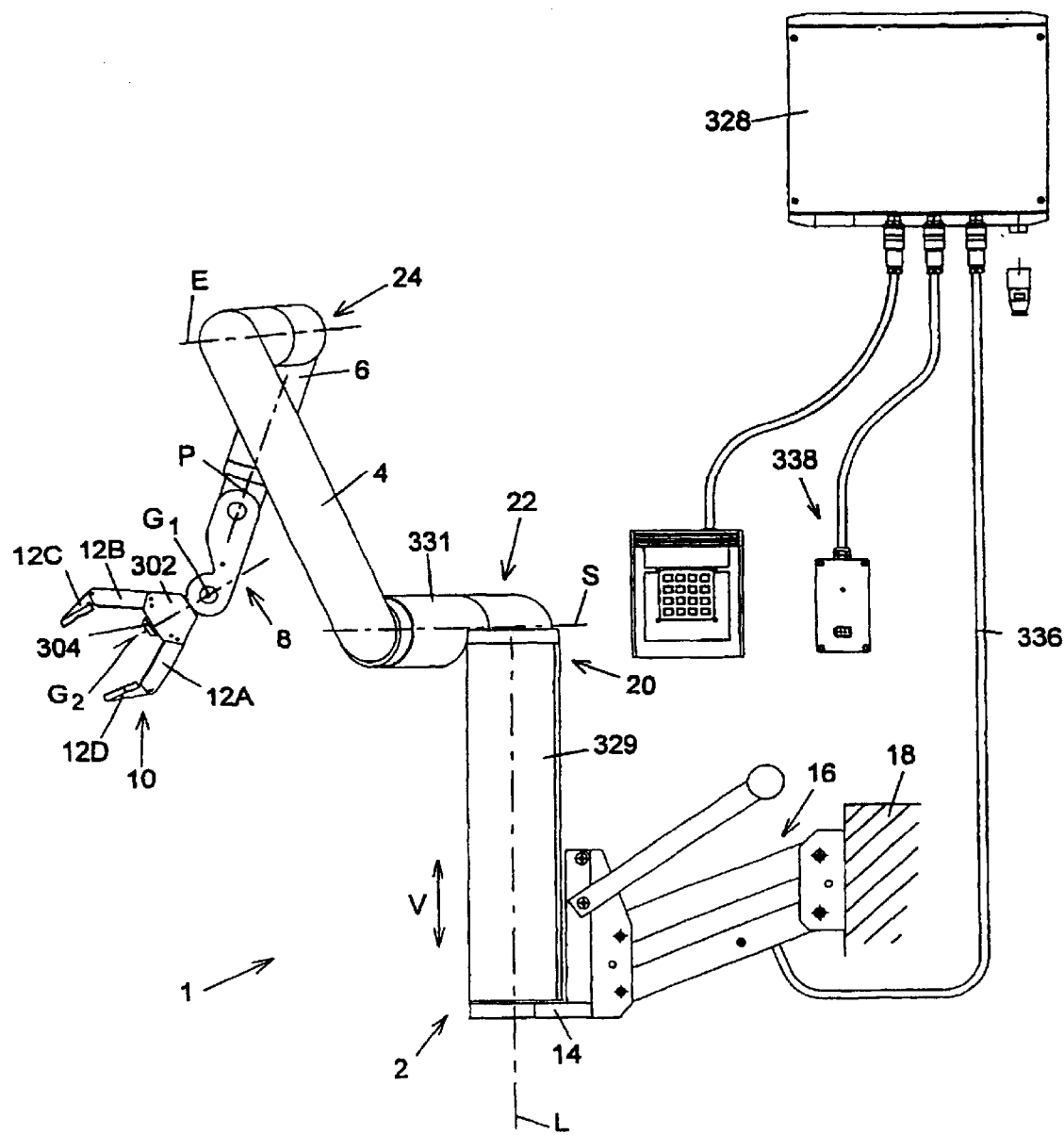

In this specification, identical or corresponding parts have identical or corresponding reference numerals. In this specification, a manipulator 1 is shown having a foot part 2, a first member 4, a second member 6, a third member 8 and a gripper 10. The gripper 10 is designed with, for instance, two or three fingers 12A, 12B that can be moved towards each other, but, if so desired, it may also be designed differently, for instance with snap means specifically adjusted to an object to be picked up or engaged otherwise, magnetic means, more or fewer fingers, and the like. In this specification, the first member 4 will be referred to as upper arm, the second member 6 will be referred to as lower arm and the third member 8 will be referred to as wrist. The foot part 2 is of substantially tubular design, as will be explained in more detail hereinbelow, and is connected, via a foot plate as shown in more detail in FIG. 10, to a base plate 14 for rotation about its longitudinal axis L, which base plate 14 can be directly connected to the fixed world or, for instance, to a constructional part 18 via a parallel arm construction 16, as shown in FIG. 1, to enable the manipulator 1 to be moved in vertical direction V. Of course, other types of suspension constructions can be used, enabling translating and/or rotating movements of the entire manipulator 1 in the desired directions.

Adjacent the top end 20, the foot part 2 has a shoulder 22 which connects the upper arm 4 to the foot part 2 in such a manner that said upper arm can rotate around a shoulder axis S, N times 360°, N preferably being greater than 1. In a joint to be referred to as elbow 24, the upper arm 4 is connected to the lower arm 6 in such a manner that they can rotate relative to each other around an elbow axis E, again through an angle of N times 360°, N being preferably greater than 1. The elbow axis E and the shoulder axis S are preferably in parallel relationship. The wrist 8 is connected to the lower arm 6 in such a manner that they can rotate relative to each other around a wrist axis P, extending preferably in the longitudinal direction of the lower arm 6 and the wrist 8, which are in line, and enclosing an angle of 90° with the elbow axis E. The wrist 8 can again rotate N times 360° around the wrist axis P, N again being preferably greater than 1. Via a first gripper axis G1 and a second gripper axis G2, the gripper 10 is connected to the wrist 8, with the first gripper axis G1 extending at right angles to the wrist axis P and the second gripper axis G2 extending at right angles to the first gripper axis G1, the arrangement being such that the gripper axis G1 constitutes the normal on the plane defined by the wrist axis P and the gripper axis G2 when not in line. The first gripper axis G1 enables pivotal movement of the gripper 10 in said plane defined by the wrist axis and the gripper axis G2 through an angle of, for instance, about 330°, while the second gripper axis G2 enables rotation of the gripper 10 through an angle of again N times 360°, N preferably being greater than 1. As a result, the gripper 10 has a particularly great range. The distance between the elbow axis E and the first gripper axis G1, which can be brought into parallel relationship, is preferably smaller than the distance between the elbow axis E and the shoulder axis 22 to the effect that the gripper 10, the wrist 8 and the lower arm 6 can be moved in between the elbow 24 and the shoulder 22. Moreover, the shoulder 22 is preferably dimensioned such that said movement can also be performed when the upper arm 4 is located next to the foot part 2. Thus, a particularly compact storing position can moreover be realized, with foot part 2, lower arm 6 with wrist 8 and gripper 10 and the upper arm 4 extending approximately parallel to each other.

The foot part 2, as shown in more detail in FIGS. 2–5, comprises a tubular section 26 which is preferably extruded from, for instance, aluminum, with for instance a profile as shown in FIGS. 4A and 4B, hatched and non-hatched portions. The section as shown in FIG. 4A is rotated over an angle of 90° relative to the section as shown in FIG. 4B. In its primary, extruded form, the tubular section 26 is substantially symmetrical relative to two planes A1, A2, extending at right angles to each other, and comprises a substantially cylindrical longitudinal wall 28, two parallel extending intermediate partitions 30 and a central partition 32, connecting the intermediate partitions 30 at their centers. As shown in particular in FIGS. 3A–3C, seven profiles 34A–34G are provided in the intermediate partition 32 by means of drilling and/or milling, for which purpose suitable openings 36A, 36B are provided in the longitudinal wall of the tubular section 28. The profiles 34A–G are all identical, provided with a central bore 38 and mounting holes 40 provided around them. At the upper four profiles 34A–D, a slightly stepped face 42 is provided on the left-hand side, at the lower three profiles 34E–G, such face 42 is provided on the right-hand side.

As shown in FIG. 5, from the side facing away from the stepped face 42, a motor 44 can be fitted against the profile 34, secured in the holes 40, with the motor shaft 46 extending through the relevant central opening 38. Arranged on the motor shaft is a sleeve 48 carrying a geared belt wheel 50 that is preferably formed integrally therewith. By means of an end plate 52 and a suitable bearing 54, the sleeve is bearing-mounted and retained relative to the tubular section 26 such that the geared belt wheel 50 can be rotated by means of the motor 44, with the interposition of a reduction device 56, so that in each case a suitable rotation of the geared belt wheel 50 can be effected in a particularly accurate manner through the interposition of the reduction device 56, by means of the motor 44. The reduction device 56 and the motor 44 are in alignment, with the reduction device 56 being confined within the sleeve 48. In this manner, a motor 44A–G with reduction device 56 and sleeve 48 is accommodated in each profile 34A–G, schematically shown in FIG. 3C. As appears from FIG. 3C, for each motor 44A–G, only the sleeve 48, at least the position of the geared belt wheel 50 thereon, is varied, such that these geared belt wheels 50 are juxtaposed in side elevation, for reasons to be specified hereinbelow. Accordingly, the motors 44, reduction casings 56 and sleeves 48 are relatively simple and inexpensive to manufacture. As appears from FIG. 5, between one of the intermediate partitions 30 and the adjoining part of the tubular section 26, there is enclosed a space 58 into which a printed circuit board 60 with electronic components is inserted, for instance from the top side, while adjacent the bottom end, a plug part is provided (not shown) which can be coupled to a negative plug part on the foot plate 312 (not shown). This allows the printed circuit board 60 to be exchanged or at least removed relatively easily for inspection, repair or adjustment.

Provided adjacent the top end 20 of the tubular section 26 is a semicircular recess 62 of a suitable profile, in which a pack of first drive shafts 64 for the shoulder axis s can be secured, which pack of shafts 64 is shown in more detail in FIG. 6. The shoulder axis S extends at right angles to the longitudinal axis L of the foot part 2.

The pack of first drive shafts 64 comprises six hollow shafts, fitted concentrically one within the other and bearing-mounted relative to each other in a manner to be described in more detail hereinbelow. The shafts are relatively thin-walled, so that a compact pack of first drive shafts 64 is obtained.

The first rotary shaft 66, located outside, is relatively short and fixedly connected, adjacent a first end 68 thereof, to a shoulder plate 70 which can be fixedly connected to an upper arm section 72. To that end, the shoulder plate 70 can be secured, by means of bolt joints not shown through holes 72, in holes having internal screw thread 74 in a shoulder piece 76. This means that rotation of the first rotary shaft 66 will involve rotation of the upper arm 4 around the shoulder axis S. Adjacent the second end 78 of the pack of first drive shafts 64, which second end is located in or at least above the foot part 2, the first rotary shaft 66 is fixedly connected to a first geared belt wheel 80 and to a first eccentric 82, to be specified hereinbelow. Provided over the first geared belt wheel 80 is a geared belt, which moreover bears on the geared belt wheel 50 of the sleeve 48F. For clarity's sake, the geared belts are not shown. The second rotary shaft 84 is provided with a second driving geared belt wheel 86 adjacent its second end 78 and with a second driven geared belt wheel 88 adjacent its first end. The second driving geared belt wheel 86 is coupled to the geared belt wheel 50 of the sleeve 48E via a geared belt. Moreover, on the second rotary shaft 84, a second eccentric 87 is mounted next to the second driving geared belt wheel 86. The third rotary shaft 90 is provided with a third driving geared belt wheel 92 adjacent its second end and with a third driven geared belt wheel 94 adjacent its first end. The fourth rotary shaft 96 is provided with a fourth driving geared belt wheel 98 adjacent its second end and with a fourth driven geared belt wheel 100 adjacent its first end 68. The fifth shaft 102 is provided with a fifth driving geared belt wheel 104 adjacent its first end and with a fifth driven geared belt wheel 106 adjacent its second end. The sixth rotary shaft 108 is provided with a sixth driving geared belt wheel 110 adjacent its second end 78 and with a sixth driven geared belt wheel 112 adjacent its first end 68. The third 92, fourth 98, fifth 104 and sixth driving geared belt wheel 110 are coupled via suitable geared belts to the geared belt wheels on the sleeves 48D, 48C, 48B and 48A respectively. For clarity's sake, these geared belts are not shown, either. Before the geared belt wheels 50 on the different sleeves 48 are displaced relative to each other, the different geared belts (not shown) can be located side by side.

Figures 2, 2A:
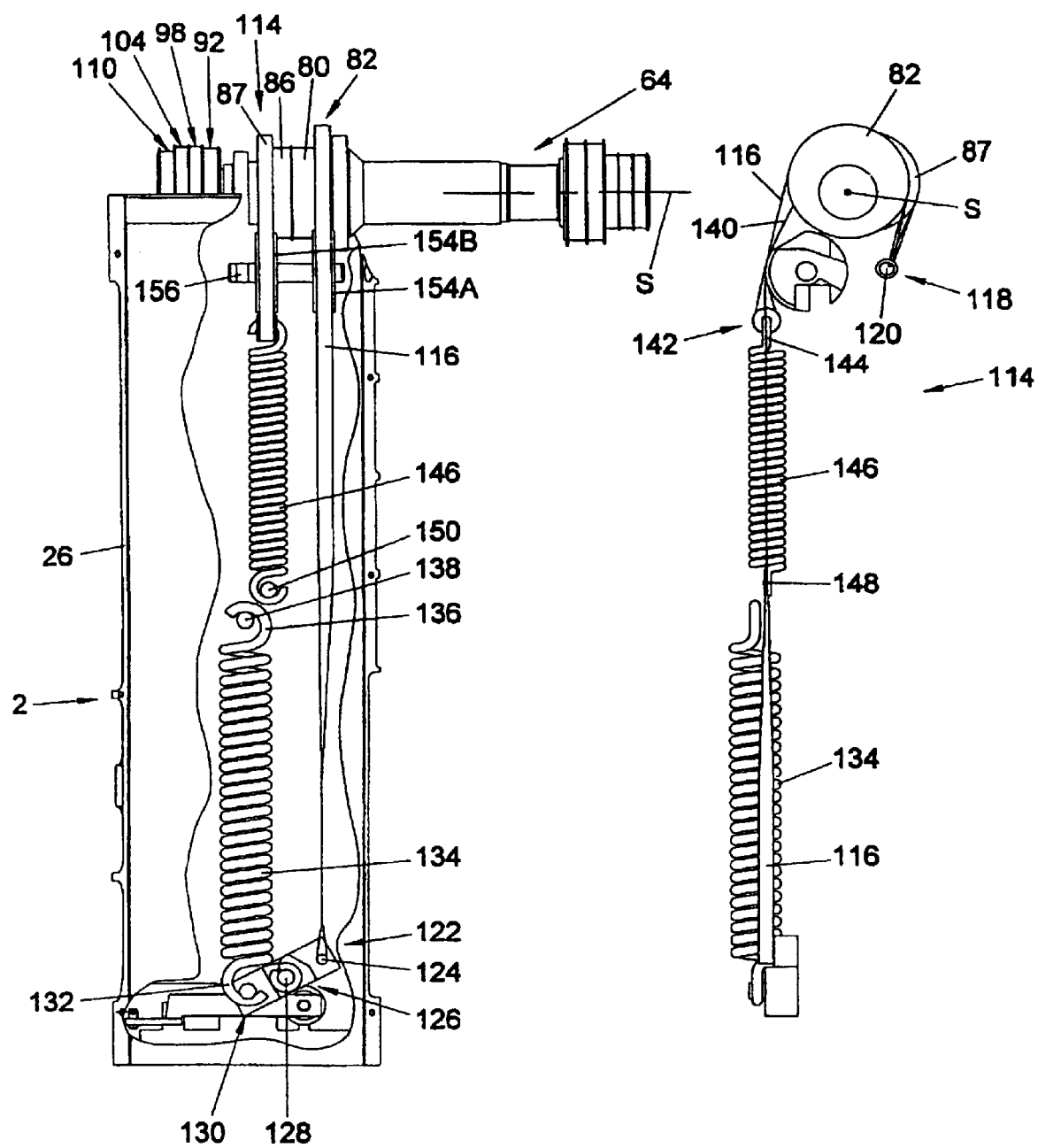
FIG. 2 is a partially sectional side elevation of a foot part with a pack of first drive shafts for the shoulder axis of a manipulator according to FIG. 1.
FIG. 2A is a side elevation of compensating means according to FIG. 2.

FIG. 2 is a partially sectional side elevation of the foot part 2 containing the pack of first drive shafts 64 and compensating means 114, shown separately in side elevation in FIG. 2A. For clarification, FIG. 2A shows the eccentrics separately, i.e. without showing the rotary shafts therein. As FIG. 2A clearly shows, the eccentrics 82, 87 have a substantially circular cross section, with the shoulder axis S as point of rotation of the eccentrics lying eccentrically relative to the center of the relevant eccentrics 82, 87. Passed over the first eccentric 82 is a first band-shaped element 116 which, adjacent a first end 118 thereof, is attached to the tubular section 26 in a point of attachment 120 which is fixed in position. The opposite second end 122 of the first band-shaped element 116 is attached to a first end 124 of a tilting arm 126 adjacent the bottom end of the foot part 2, which tilting arm 126 is bearing-mounted in a point of rotation 128 for pivoting relative to the foot part 2. Mounted adjacent the opposite second end 130, relative to the pivotal axis 128, of the tilting arm 126 is a first end 132 of a first tension spring 134. The opposite second end of the relevant first tension spring 134 is secured to a pin 138 which is fixed in position and fixedly connected to the foot part 2. Rotation of the first rotary shaft 66 involves rotation of the first eccentric 82, causing the length and/or position of the part of the first band-shaped element 116 abutting against the eccentric to change. This causes the second end 122 of the band-shaped element to move in vertical direction, while pivoting the tilting arm 126. When the first end 124 of the tilting arm 126 is moved up by the band-shaped element 116, the opposite second end 130 is moved down, involving axial extension of the first tension spring 134. This increases the tension in the band-shaped element, so that the frictional force between the band-shaped element 116 and the first eccentric 82 is increased. The first eccentric 82 is positioned and dimensioned such that said frictional force is maximal, i.e. that the vertical distance between the shoulder axis S and the abutting first band-shaped element 116 is maximal, at least relatively large when the upper arm 4 extends approximately horizontally and hence exerts a maximal moment relative to the shoulder axis S. Upon movement of the upper arm 4 from such horizontal position into a vertical position, the eccentric 82 is moved such that the vertical distance between the shoulder axis S and the first band-shaped element 116 bearing on the first eccentric 82 decreases, so that the tilting arm 126 will rotate clockwise, viewed in FIG. 2, due to the first tension spring 134, while moving the second end 122 of the band-shaped element 116 along. This will involve a decrease of said frictional force between the first band-shaped element 116 and the first eccentric 82, preferably approximately in proportion to the decrease of the moment exerted by the lower arm 4 relative to the shoulder axis S. Thus, compensation for the position of at least the upper arm 4, at least the forces exerted thereby, is continuously effected in a particularly simple manner. The advantage thus achieved is that a relatively light motor 44 and a light construction can be used for driving at least the upper arm.

Similarly, a second band-shaped element 140 has a first end 118 secured in the point of attachment 120 and passed over the second eccentric 87, which second band-shaped element has its opposite, second end 142 directly coupled to a first end 144 of a second tension spring 146. The opposite, second end 148 of the second tension spring 146 is connected to a pin 150 which is fixedly connected to the foot part 2 and which is fixed in position. The operation of the second eccentric 87 and the spring 146 coupled thereto is comparable with the operation as described hereinabove in respect of the first eccentric 82 and the first tension spring 134. As will be described in more detail hereinbelow, by means of the second rotary shaft 84, the movement of the lower arm 6 relative to the upper arm 4 is controlled, which means that the second eccentric 87, coupled to the second rotary shaft 84, compensates for the position of the lower arm 6, the wrist 8 and at least partially for the gripper 10. Again, it applies that at a vertical position of the lower arm 6, the spring length of the second tension spring 146 will be minimal, at least relatively small, and at a horizontal position of the lower arm 6, it will be greater, in particular maximal, so that proportional changes of the frictional force between the second band-shaped element 140 and the second eccentric 87 can be effected, preferably in proportion to the change of the moments exerted by the lower arm 6 and said parts connected thereto relative to the elbow axis E. The compensating means 114, in particular the springs 134 and 146 and the tilting arm 126, as well as the band-shaped elements 116, 140, are substantially retained within the foot part 2, in a second space 152 formed therein between an intermediate partition 30 and the adjoining portion of the longitudinal wall 28 of the foot part 26, which space is located on the side of the foot part other than the space 58 accommodating the printed circuit board 60. As a result, the compensating means are simply screened from the environment. To effect a vertical position of at least the springs 146, 134, two guide wheels 154A, 154B are mounted on a shaft 156 directly below the eccentrics 82, 87, over which the band-shaped elements 116, 140 are guided. The guide wheels 154A, B can move freely. It will be understood that the springs 134, 146 can also be coupled to the band-shaped elements 116, 140 in another manner and that, moreover, other spring means can be used, for instance pressure springs, torsion springs and the like, depending on the mechanisms chosen. The embodiment chosen offers the advantage that it can readily be accommodated in said space 152.

As shown in FIG. 6, the upper arm section 72 comprises a shoulder piece 76 which is slightly knee-shaped. In a manner described hereinabove, the first end 158 of the shoulder piece 76 can be coupled to the shoulder plate 70, while the second end 160, extending at right angles to the first end 158, is connected to a sleeve 162, whose opposite side is connected to a first end 164 of a knee-shaped first elbow piece 166. The second end of the elbow piece 166, extending parallel to the first end 158 of the shoulder piece 76, is open, such that a pack of second drive shafts 170 can be partially inserted therein, as shown in FIG. 7A. In FIG. 7A, the sleeve 162 has been left out.

The elbow piece 166 with the pack of second drive shafts 170 is shown in more detail in FIG. 7C, which also shows the lower arm section with a portion of a pack of third shafts 172.

The pack of second shafts 170 comprises a seventh rotary shaft 174 provided with a seventh driving geared belt wheel 176 adjacent a first end thereof and fixedly connected, via an end plate 178, to the lower arm section 180 adjacent its opposite end. Hence, rotation of the seventh rotary shaft 174 involves a rotation of the lower arm 6 relative to the upper arm 4 around the elbow axis E. The shafts of the pack of second drive shafts 170 are again hollow and thin-walled and concentrically positioned relative to each other. An eighth rotary shaft 182 is provided with an eighth driving geared belt wheel 184 adjacent its first end and with a frustoconical eighth driven gear 186 adjacent its opposite end. The ninth rotary shaft 188 is provided with a ninth driving geared belt wheel 190 adjacent its first end and with a frustoconical ninth driven geared belt wheel 192 at its opposite end, the tenth rotary shaft 194 is provided with a tenth driving geared belt wheel 196 adjacent its first end and with a frustoconical tenth driven gear 198 adjacent its second end. The inner eleventh rotary shaft 200 is provided with an eleventh driving geared belt wheel 202 adjacent its first end and with a frustoconical driven eleventh gear 204 adjacent its opposite second end. The frustoconical gears 186, 192, 198 and 204 are substantially fitted one within the other, with the interposition of suitable bearings 205, for instance ball bearings, such that these gears form a frustoconical body.

In assembled condition, the second driven geared belt wheel 88 is coplanar with the seventh driving geared belt wheel 176, the third driven geared belt wheel 94 is coplanar with the eighth driving geared belt wheel 184, the fourth driven geared belt wheel 100 is coplanar with the ninth driving geared belt wheel 190, the fifth driven geared belt wheel 106 is coplanar with the tenth driving geared belt wheel 196 and the sixth driven geared belt wheel 112 is coplanar with the eleventh driving geared belt wheel 202. Suitable geared belts, not shown in the Figures, connect the relevant driven and driving geared belt wheels such that rotations can be transmitted. Thus, rotation of the second driven geared belt wheel 88 will result in a rotation of the seventh driving geared belt wheel 7, whereby the end plate 178 is rotated and, accordingly, the lower arm 6. It will be understood by anyone skilled in the art that in a similar manner, the rotary shafts 182, 188, 194 and 200 of the pack of second drive shafts 170 can be rotated.

Included in the sleeve 162 are tension rods 206, whereby the distance between the shoulder piece 76 and the first elbow piece 166 can be set, in such a manner that the tension in the geared belts can be set. In so far as it is not further specified, bearings, such as the bearings 204 mentioned, are represented in the drawing by rectangles with a cross placed therein. The geared belt wheels comprise interposed flanges to prevent the geared belts from touching each other or running from the relevant geared belt wheels.

Included in the lower arm 6, designed as a tubular section 180, is a pack of third shafts 172, enclosing an angle with the pack of second shafts 170, such that the elbow axis E extends at right angles to the wrist axis P. The pack of third shafts 172 comprises three concentrically interfitted hollow shafts and a spring mechanism. A twelfth rotary shaft 208 is provided with a twelfth driving frustoconical gear 210 adjacent its first end located at the elbow axis E and is fixedly connected to an end piece 212 of the wrist 8 adjacent its opposite, second end. Hence, rotation of the twelfth rotary shaft 208 involves a rotation of the wrist 8 relative to the lower arm section 180 around the wrist axis P. A thirteenth rotary shaft 214 is provided with a thirteenth frustoconical driving gear 216 adjacent its first end and with a first crown wheel 218 at its second end, which first crown wheel will be described in more detail hereinbelow. A fourteenth rotary shaft 220 is provided with a fourteenth frustoconical gear 222 adjacent its first end and is connected to a second crown wheel 224 adjacent its opposite, second end. Included within the fourteenth rotary shaft 220 is a fifteenth rotary shaft 226, which is provided with a fifteenth frustoconical gear 228 adjacent its first end and which has its second end, located within the fourteenth rotary shaft 220, connected, via a screw thread connection, to a guide block 230 which is likewise located within the fourteenth rotary shaft 220. Rotation of the fifteenth rotary shaft 226 effects a translation of the guide block 230 in the longitudinal direction of the fourteenth rotary shaft 220, as rotation is prevented by a suitable guide 232. Connected to the side of the guide block 230 remote from the fifteenth gear 228 is a first end of a tension spring 234, which tension spring is retained within the fourteenth rotary shaft 220 and has its opposite second end connected, via a U-shaped plate part 236 and a pin 238, to a first end of a tension belt 240, as shown in FIGS. 7A and 7B.

As appears in particular from FIG. 7C, the eleventh driven gear 204 is in mesh with the fifteenth driving gear 228, the tenth driven gear 198 is in mesh with the fourteenth driving gear 222, the ninth driven gear 192 is in mesh with the thirteenth driving gear 216 and the eighth driven gear 186 is in mesh with the twelfth driving gear 210. As a result, rotations of the relevant shafts in the pack of first shafts 64, initiated by the relevant motors 44, can directly be transmitted to the respective rotary shafts 208, 214, 220, 226 in the lower arm 6 and the wrist 8.

The wrist 8 comprises a second tubular section 242, a first crown wheel assembly 244, shown in more detail in FIG. 8, and a second crown wheel assembly 246, shown in more detail in FIG. 9. The first crown wheel assembly 244 comprises the first crown wheel 218 and the second crown wheel 224. In this context, 'crown wheel' should be understood to mean a gear having a toothed ring lying on a conical surface. In the second tubular section 242, a first bearing bush 248 is secured in the wall by means of a bolt 250, while a second bearing bush 252 is secured, also by a bolt, in the wall on the opposite side. The bearing bushes 248, 252 are slightly displaced relative to each other in the longitudinal direction of the wrist. Around the first bearing bush 248, a third crown wheel 254 is bearing-mounted. The toothed ring 256 of this third crown wheel meshes with the toothed ring 257 of the first crown wheel 218, such that rotation of the first crown wheel 218 can be transmitted to the third crown wheel 254. The axial displacement of the bearing bushes 248, 252 provides that the third crown wheel 254 can rotate freely relative co the second crown wheel 224. Similarly, a fourth crown wheel 258 is bearing-mounted around the second bearing bush 252, the teeth 260 of which mesh with the teeth 261 of the second crown wheel 224. Rotation of the second crown wheel 224 thus provides that the fourth crown wheel 258 is rotated. On the third crown wheel 254, a sixteenth geared belt wheel 262 is secured, on the fourth crown wheel 258, a seventeenth geared belt wheel 264 is secured. The third crown wheel 254 and the fourth crown wheel 258 are each on both sides provided with a frustoconical chamber 266, 268, in which a number of rolling bodies, such as balls 270, 272 respectively, or other suitable bearing means, such as disks, are retained while abutting against the relevant crown wheel 254, 258 and the bearing bush 248, 252 and, at the exterior chambers 266, against the wall of the second tubular section 242. Thus, a robust and simple, compact bearing of the relevant crown wheels is obtained in a particularly simple manner. The bearing bushes 248, 252 are interconnected by a cylindrical sleeve 271 in which the fourteenth rotary shaft 220 is bearing-mounted.

The second crown wheel assembly 246 comprises a bearing block 272, pivotable about two bolts 274 which are coaxially and diametrically opposite to each other in one plane with the bolts 250 and secured and bearing-mounted in the wall of the second tubular section 242, which bolts 274 define the first pivotal axis G1 of the gripper 10. The band-shaped element 240 extends through this bearing block 272 to a gripper block 276. The band-shaped element 240 is guided along a guide roller 278 which provides guidance of the band-shaped element 240 during pivotal movement of the gripper around the first gripper axis G1. Bearing-mounted on either side around a bearing bush 280 of the bearing block 272 are a fifth crown wheel 282 and a sixth crown wheel 284, provided with an eighteenth geared belt wheel 286 and a nineteenth geared belt wheel 288 respectively. A first wrist geared belt 290 extends over the sixteenth 262 and eighteenth geared belt wheel 286, a second wrist geared belt 292 extends over the seventeenth 264 and nineteenth geared belt wheel 288, for transmitting the relevant rotations. The bearing block 272 further comprises a third bearing bush 294, extending in the direction away from the lower arm and coaxially with the wrist axis P, with the band-shaped element 240 extending through the relevant bearing bush. Bearing-mounted around the third bearing bush 294 is a seventh crown wheel 296, whose teeth 29B mesh with the teeth 297 of the fifth crown wheel 282 and with the teeth 299 of the sixth crown wheel 284. The seventh crown wheel 296 is provided with bolt holes 300 on which the body 302 of the gripper 10 can be secured. Hence, rotation of the seventh crown wheel 296 around the third bearing bush 294 causes rotation of the gripper 10 around the second gripper axis G2.

By means of the first and second crown wheel assemblies 244, 246, the gripper can be moved around the two gripper axes G, G2 as follows. If the third and fourth crown wheels 254, 258 are rotated in the same direction, the fifth and sixth crown wheels 282, 284 are rotated in the same direction as well, as a result of which the gripper 10 will be rotated around the first gripper axis G1 in the direction of rotation of the relevant crown wheels. If the third crown wheel 254 and the fourth crown wheel 258 are rotated in opposite directions, at least not at equal speed in the same direction, the seventh crown wheel 296 will be rotated, as a result of which the gripper body 302, and accordingly the gripper 10, will be rotated around the second gripper axis G2, while moreover, depending on the difference between the rotations of the third and fifth, respectively fourth and sixth crown wheel, a pivotal movement around the first gripper axis G1 can simultaneously be effected. The guide roller 278 will provide that the band length of the band-shaped element 240 within the gripper 10 remains approximately the same, so that the position of the fingers 12A, 12B of the gripper 10 is hardly influenced.

The fifth, sixth and seventh crown wheels 282, 284 and 296 are again provided with frustoconical chambers 266, 268, in which suitable bearing means, in particular balls 270, 272 are again included, for obtaining simple, relatively inexpensive and robust bearings which, moreover, are particularly compact.

By means of a bolt 304, the gripper 10 is fixed with the gripper body 302 on a threaded end 306 of the gripper block 276 while enclosing the fingers 12A, 12B, or at least the movement bodies thereof. The gripper block 276 is movable in axial direction within a sleeve 308 forming the extension of the third bearing bush 294. If the band-shaped element 240 is pulled away in the direction of the lower arm by means of the spring 234, the gripper block 276 is pulled into the relevant sleeve 308, causing the fingers 12A, 12B to be pulled towards each other, while the fingers are biased in the open position by a spring, not shown, provided therebetween, such that when the gripper block 276 moves forwards out of the sleeve 308 again, the fingers will be spread. The fingers 12A, 12B comprise end pieces 12C, 12D which, upon movement of the fingers 12A, 12B, will continue to extend approximately parallel to each other, to obtain a proper gripper surface at any position of the fingers 12A, 12B.

The foot part 2 has its bottom end mounted on a foot ring 310 (FIG. 10), which is bearing-mounted in a manner to be further described hereinbelow relative to a foot part 312 connected to the base plate 14. The foot plate 312 has its outer circumference provided with a first groove 314 of a substantially V-shaped cross section, while in a corresponding manner, the foot ring 310 is provided with a second groove 316 along its inner circumference. The first and second grooves 314, 316 together form a bearing race 320 of a substantially square cross section. Provided in the foot ring 310 is an opening 318 ending in the bearing race 320, in which balls 322 are fittingly included. The balls bear against the walls of the bearing race 320 to obtain a very good retention and a very strong bearing in a particularly simple and relatively inexpensive manner. The balls 322 can be introduced into the bearing race 320 through the opening 318, after which the opening 318 can be closed by means of a stop 324. Provided in the foot plate 312 is an electric contact element 326 enabling coupling to a control unit 328, which control unit may also comprise, for instance, an electric power supply. Via sliding contacts 330, not specifically shown, control signals for the different motors 44 can be transmitted from the control unit 328, while the foot part 2 with the foot ring 310 can be rotated N times 360° around the longitudinal axis L, N preferably being greater than 1. A support bearing and/or seal 332 may be incorporated between the foot ring 310 and the foot plate 312 to obtain an entirely closed foot part 2. The foot plate 312 comprises a sleeve 331 which is positioned so as to be coaxial with the longitudinal axis L and which has its outside provided with teeth 329. Around these teeth, a geared belt (not shown) can be provided, which is laid, via return wheels which are not shown either, around the geared belt wheel 50 on the lower sleeve 48C, such that when the relevant motor 44G is driven, the geared belt is driven and the foot part 2 rotates about the longitudinal axis L via the teeth 329.

In the pack of first drive shafts 64 shown in FIG. 6, adjacent the second end, a bearing 332 is in each case provided between two rotary shafts located one within the other, for which purpose at least one bearing chamber is in each case arranged as an annular groove in the relevant adjoining thin-walled rotary shafts, preferably on the outside of the respective inner rotary shafts. In this bearing chamber, bearing needles can simply be provided, after which the shafts can be slid one into the other and the relevant driven geared belt wheels can be secured thereon, at the first end, with the inclusion of suitable bearings, for instance ball bearings 334, between the relevant driven geared belt wheels. Thus, a particularly compact and suitable needle bearing for the relevant shafts is obtained in a particularly simple, relatively inexpensive and robust manner.

A manipulator according to the present invention can be used as follows.

By means of the suspension means 16, the manipulator 1 is mounted on a frame 18 and coupled to the control unit 328 by means of a cable 336. Moreover, operating means 338 are coupled to the control unit 328. The foot part 2 is covered with a tubular section 329, for instance made of plastic. Moreover, covering parts 331 are fitted on the shoulder, such that at least the foot part 2, the shoulder 22, the upper arm 4, the elbow 24, the lower arm 6 and the wrist 8 are outwardly closed. In the manner described, the packs of shafts are intercoupled, which involves the driving geared belt wheels adjacent the first end of the pack of first drive shafts 64 being coupled to the geared belt wheels 50 of the relevant motors.

By the operating means, in respect of which particular combinations of movements may be preprogrammed or discretely operable, the different motors 44A–G can be controlled, whereby the geared belts can be driven by the relevant sleeves 48A–G. By driving the first rotary shaft 66, the upper arm can be rotated around the shoulder axis, by driving the second rotary shaft 48, the lower arm 6 can be rotated around the elbow axis E. Through rotation of the third rotary shaft 90, the wrist is rotated relative to the lower arm 6 around the wrist axis P, through rotation of the fourth rotary shaft 96, the first crown wheel 218 is driven, through rotation of the fifth rotary shaft 102, the second crown wheel 224 is driven. Separate or combined drive of the relevant crown wheels 218, 224 results in the above-described movements of the gripper around the first and second gripper axes G1, G2. Finally, rotation of the sixth shaft 108 results in opening and closing of the gripper 10. The spring 234 involved has the advantage of compensating for unduly great closing forces, i.e. unduly great closing forces will be prevented in that the spring 234 will in that case slightly expand. As indicated hereinabove, drive of the lowermost motor 44G results in rotation of the foot part 2 relative to the base plate 14. With a manipulator 1 according to the invention, the gripper 10 can reach almost any position around the foot part within a space defined by the length of a stretched upper arm and lower arm, while the pivoting mechanism 16 can moreover increase the range still further. Thus, unlike known industrial robots, the gripper 10 can reach and even engage the foot part 2, adjacent the top side as well as adjacent the bottom end thereof.

As all motors and reduction casings are accommodated in the foot part 2, as well as a major portion of the electronics, while only shafts and belts have been provided in the different members, the arm of the manipulator 1 is relatively light and robust, while it is not susceptible to, for instance, influences of radiation, gases and the like. This offers the advantage that a manipulator 1 according to the invention is, for instance, particularly suitable for use in radiation spaces, such as reactor spaces, in toxic environments, in narrow spaces and the like. Moreover, due to in particular the compensating means 114, relatively great forces can be transmitted and heavy loads can be carried, while the motors may be of a relatively light and simple construction. A manipulator according to the invention can be controlled quickly and accurately, while the gripper can be positioned particularly precisely. Of course, a manipulator 1 according to the invention is also particularly suitable for other, for instance ambulant use, such as by handicapped persons or as industrial robot arm.

The invention is in no way limited to the exemplary embodiments shown in the specification and drawings. Many variations thereof are possible. Thus, more or fewer members may be provided, while the different packs of shafts may have a correspondingly different number of shafts. Instead of the geared belt bands in the upper arm, a pack of drive shafts may be provided herein as well, comparable with the packs of first and second drive shafts, utilizing comparable bevel gear assemblies. If necessary, the geared belt bands may of course be replaced by, for instance, chains, ropes and like drive means. Such variations are directly understood by a skilled person. Also, as indicated, other types of gripper means may be provided. Constructional details may be varied. Thus, the different bearing means may, for instance, be designed differently, the foot part may be hingably or pivotally arranged or, conversely, be fixed in position, the motors and reduction casings, as well as sleeves with geared belt wheels 50, may be designed differently, and limitations for the rotational possibilities of the different members may or may not be provided electronically. The different rotary shafts may be arranged in the respective packs of shafts in a different order, while the members may moreover be positioned differently relative to each other, depending on the desired possibilities of movement. These and many variations are understood to fall within the framework of the invention set forth by the claims.

What is claimed is:

1. A manipulator comprising a foot part and a number of members connected to the foot part and to each other respectively, and at least a gripper, such that the members and the gripper constitute, with the foot part, an arm, wherein drive means, comprising motors for moving at least a number of the members and the gripper are provided in the foot part wherein a first member, comprising an upper arm, is rotatable at least 360° about a shoulder axis relative to the foot part and a second member, comprising a lower arm, is rotatable about an elbow axis relative to the first member, wherein compensating means being provided in the foot part for the first and second member which, upon rotational movement of the members, at least partially compensate for the moment exerted by the first member relative to the foot part and by the second member relative to the elbow axis, the arrangement being such that thus, during use, couples acting on a number of drive means are limited;

wherein the shoulder axis comprises at least a first rotary shaft and a second rotary shaft, the first rotary shaft being coupled to the first member and the second rotary shaft being coupled to the second member, the compensating means comprising a first eccentric coupled to the first rotary shaft and a second eccentric coupled to the second rotary shaft, first and second spring means being coupled to the first and the second eccentric respectively, the eccentrics being directed such that at the maximally reachable horizontal position of the relevant arm part, the force exerted on the relevant rotary shaft by the spring means is maximal and at the maximally reachable vertical position of the relevant arm part, said force is minimal.

2. A manipulator according to claim 1, wherein the shoulder axis and the elbow axis, during use, extend substantially parallel to each other and horizontally, and are located adjacent opposite ends of the first member, the gripper being rotatable about at least a first gripper axis relative to the second member, said first gripper axis enclosing an angle of about 90° with the elbow axis.

3. A manipulator according to claim 1, wherein the spring means comprise a first and a second compression or tension spring which are at least substantially accommodated in the foot part, with a first and a second band-shaped element respectively extending from the springs over the first and second eccentric respectively, the end distal from the relevant spring being fixed in position, the arrangement being such that upon rotation of an eccentric by means of the relevant rotary shaft, the relevant spring changes in length.

4. A manipulator according to claim 1, comprising a gripper connected to the lower arm, wherein the drive means comprises motors for moving the upper arm, lower arm and gripper are provided in the foot part.

5. A manipulator according to claim 4, wherein a third member is provided, comprising a wrist, between the second member and the gripper, drive means for the wrist being included in the foot part.

6. A manipulator according to claim 1, wherein each motor is coupled to a reduction casing aligned therewith, the reduction casing being connected to a drive wheel connected, via transmission means, to one of a number of drive shafts, included in or adjacent shoulders, the upper arm, lower arm, a wrist or gripper.

7. A manipulator according to claim 6, wherein a number of reduction cases are mutually identical, each connected to a drive shaft mounting the relevant drive wheel, the assemblies of reduction casing and drive wheel differing from each other only by the position of the drive wheel relative to the relevant motor.

8. A manipulator according to claim 1, wherein the foot part comprises a foot plate which, by means of a bearing, is rotatably connected thereto adjacent the lower end of the foot part, a number of sliding contacts being provided for transmitting an electric tension between the drive means and a power supply located outside the foot part, and a control unit.

9. A manipulator according to claim 8, wherein the bearing for the foot plate comprises an annular groove in the outer circumference of the foot plate and a corresponding annular groove on an inner surface of a tube of the foot part, the relevant outer circumference of the foot plate being substantially identical to the relevant inner circumference of the tube and both grooves having a substantially V-shaped section, such that the two grooves together define a ball track of a substantially rectangular, in particular square or diamond-shaped section which includes a series of balls whose describing line corresponds to said section of the ball track.

10. A manipulator according to claim 9, wherein an opening is provided in the tube, said opening ending in the ball track and having a passage which is approximately equal to the cross section of the balls, closing means being provided for closing said opening after insertion of the balls.

11. A manipulator according to claim 1, wherein the foot part is substantially formed from a substantially tubular extrusion section, recesses being provided for the drive means.

12. A manipulator according to claim 1, wherein spaces are provided in the foot part for accommodating spring means for compensating means and electronic components.

13. Use of a manipulator according to claim 1, in a space unsuitable for human entry, such as a radiation space or a toxic space.

14. A manipulator according to claim 1, wherein the lower arm is rotatable at least 360° about the elbow axis.

15. A manipulator comprising, in combination:
a foot;
an upper arm rotatable at least 360° about a shoulder axis relative to the foot;
a lower arm rotatable about an elbow axis relative to the upper arm;
a gripper connected to the lower arm;
motors for moving the upper arm, lower arm and gripper, each motor being provided in
the foot; and
a pair of eccentrics in the foot that at least partially compensate for the moments exerted by the upper arm as it moves about the shoulder axis relative to the foot and by the lower arm as it moves about the elbow axis relative to the upper arm such that couples acting on the motors during use are limited.

16. A manipulator according to claim 15, wherein the shoulder axis and the elbow axis extend substantially parallel to each other during use, and are located adjacent opposite ends of the upper arm, the gripper being rotatable about at least a first gripper axis relative to the lower arm, the first gripper axis preferably enclosing an angle of approximately 90° with the elbow axis.

17. A manipulator according to claim 15, wherein the shoulder axis comprises at least a first rotary shaft and a second rotary shaft, the first rotary shaft being coupled to the upper arm and the second rotary shaft being coupled to the lower arm, the eccentrics comprising a first eccentric coupled to the first rotary shaft and a second eccentric coupled to the second rotary shaft, first and second spring members being coupled to the first and the second eccentrics, respectively, the first and second eccentrics being oriented such that at a maximally reachable horizontal position of the corresponding one of the upper arm and lower arm, a force exerted on the relevant rotary shaft by the corresponding spring member is maximal and at the maximally reachable vertical position of the corresponding one of the upper arm and lower arm, said force is minimal.

18. A manipulator according to claim 17, wherein the spring members comprise a first and a second spring that are at least substantially accommodated in the foot, with a first and a second band-shaped element extending from the first and second springs, respectively, over the first and second eccentrics, respectively, an end of each band-shaped element distal from the relevant spring being fixed in position, such that upon rotation of each eccentric by means of the relevant rotary shaft, the relevant spring changes in length.

19. A manipulator according to claim 15, further comprising a wrist provided between the lower arm and the gripper, a motor for the wrist being included in the foot.

20. A manipulator according to claim 15, wherein each motor is coupled to a reduction casing aligned therewith, each reduction casing being connected to a drive wheel that is connected to one of a plurality of drive shafts.

21. A manipulator according to claim 20, wherein a plurality of the reduction casings are mutually identical, each connected to a drive shaft mounting the relevant drive wheel, each paired reduction casing and drive wheel differing from each other paired reduction casing and drive wheel only by the position of the drive wheel relative to the relevant motor.

22. A manipulator according to claim 15, wherein at least the upper arm is at least partially hollow, a series of first drive shafts extending from the foot into the upper arm and fitting coaxially one within the other, a series of second drive shafts being provided in the lower arm and fitting coaxially one within the other, a plurality of bearings being positioned between the drive shafts, a plurality of the first drive shafts having a first drive wheel at an end remote from the foot, at least one of the second shafts being provided with a second drive wheel, a first drive wheel in each case being drivingly connected, via a coupling element, to a second drive wheel, the motors in the foot being arranged for driving the respective first drive shafts, such that both the upper arm and the lower arm are movable via the first drive shafts.

23. A manipulator according to claim 22, wherein the lower arm includes a series of third drive shafts whose longitudinal direction extends approximately at right angles to a longitudinal direction of the second drive shafts, at least one of the second and third drive shafts being provided with mating frustoconical gears for transmitting rotational movements of the relevant second drive shafts to the relevant third drive shafts, at least one third drive shaft being connected to a wrist movably connected to an end of the lower arm remote from the upper arm.

24. A manipulator according to claim 23, wherein the gripper is provided on a side of the wrist remote from the upper arm and is biased in an open position, a spring element extending through the wrist and connected on one side to a block slidable in a longitudinal direction of the upper arm through rotation of one of the third drive shafts and on the other side to the gripper, such that upon rotation of the relevant third drive shaft the block is displaced in the longitudinal direction while displacing the spring element, enabling the gripper to be pulled from the open position into a closed position and vice versa.

25. A manipulator according to claim 15, further comprising a foot plate rotatably connected by a bearing to a lower end of the foot and including a plurality of sliding contacts to provide electrical contact between the motors, a power supply, and a control unit.

26. A manipulator according to claim 25, wherein the bearing for the foot plate comprises an annular groove in an outer surface of the foot plate and a corresponding annular groove on an inner surface of a tube of the foot, both grooves having a substantially V-shaped section such that the two grooves together define a ball track of a substantially rectangular-shaped section, a series of balls being provided in the ball track.

27. A manipulator according to claim 26, wherein an opening is provided in the tube, said opening ending in the ball track and having a passage with a width approximately equal to a diameter of the balls, a stop being provided for closing said opening after insertion of the balls.

28. A manipulator according to claim 15, wherein the foot is formed from a substantially tubular extrusion section, recesses being provided in the foot to receive the motors.

29. A manipulator according to claim 15, wherein spaces are provided in the foot for accommodating spring members for the eccentrics and electronic components.

30. Use of a manipulator according to claim 15, in a space unsuitable for human entry.

31. A manipulator according to claim 15, wherein the lower arm is rotatable at least 360° about the elbow axis.

32. A manipulator comprising, in combination:
a foot;
an upper arm rotatable about a shoulder axis relative to the foot;
a lower arm rotatable about an elbow axis relative to the upper arm;
a gripper connected to the lower arm;
motors for moving the upper arm, lower arm and gripper, each motor being provided in the foot; and
a pair of eccentrics in the foot that at least partially compensate for the moments exerted by the upper arm as it moves about the shoulder axis relative to the foot and by the lower arm as it moves about the elbow axis relative to the upper arm such that couples acting on the motors during use are limited.

33. A manipulator according to claim 32, wherein the shoulder axis and the elbow axis extend substantially parallel to each other during use, and are located adjacent opposite ends of the upper arm, the gripper being rotatable about at least a first gripper axis relative to the lower arm, the first gripper axis preferably enclosing an angle of approximately 90° with the elbow axis.

34. A manipulator according to claim 32, wherein the shoulder axis comprises at least a first rotary shaft and a second rotary shaft, the first rotary shaft being coupled to the upper arm and the second rotary shaft being coupled to the lower arm, the eccentrics comprising a first eccentric coupled to the first rotary shaft and a second eccentric coupled to the second rotary shaft, first and second spring members being coupled to the first and the second eccentrics, respectively, the first and second eccentrics being oriented such that at a maximally reachable horizontal position of the corresponding one of the upper arm and lower arm, a force exerted on the relevant rotary shaft by the corresponding spring member is maximal and at the maximally reachable vertical position of the corresponding one of the upper arm and lower arm, said force is minimal.

35. A manipulator according to claim 34, wherein the spring members comprise a first and a second spring that are at least substantially accommodated in the foot, with a first and a second band-shaped element extending from the first and second springs, respectively, over the first and second eccentrics, respectively, an end of each band-shaped element distal from the relevant spring being fixed in position, such that upon rotation of each eccentric by means of the relevant rotary shaft, the relevant spring changes in length.

36. A manipulator according to claim 32, further comprising a wrist provided between the lower arm and the gripper, a motor for the wrist being included in the foot.

37. A manipulator according to claim 32, wherein each motor is coupled to a reduction casing aligned therewith, each reduction casing being connected to a drive wheel that is connected to one of a plurality of drive shafts.

38. A manipulator according to claim 37, wherein a plurality of the reduction casings are mutually identical, each connected to a drive shaft mounting the relevant drive wheel, each paired reduction casing and drive wheel differing from each other paired reduction casing and drive wheel only by the position of the drive wheel relative to the relevant motor.

39. A manipulator according to claim 32, wherein at least the upper arm is at least partially hollow, a series of first drive shafts extending from the foot into the upper arm and fitting coaxially one within the other, a series of second drive shafts being provided in the lower arm and fitting coaxially one within the other, a plurality of bearings being positioned between the drive shafts, a plurality of the first drive shafts having a first drive wheel at an end remote from the foot, at least one of the second shafts being provided with a second drive wheel, a first drive wheel in each case being drivingly connected, via a coupling element, to a second drive wheel, the motors in the foot being arranged for driving the respective first drive shafts, such that both the upper arm and the lower arm are movable via the first drive shafts.

40. A manipulator according to claim 39, wherein the lower arm includes a series of third drive shafts whose longitudinal direction extends approximately at right angles to a longitudinal direction of the second drive shafts, at least one of the second and third drive shafts being provided with mating frustoconical gears for transmitting rotational movements of the relevant second drive shafts to the relevant third drive shafts, at least one third drive shaft being connected to a wrist movably connected to an end of the lower arm remote from the upper arm.

41. A manipulator according to claim 40, wherein the gripper is provided on a side of the wrist remote from the upper arm and is biased in an open position, a spring element extending through the wrist and connected on one side to a block slidable in a longitudinal direction of the upper arm through rotation of one of the third drive shafts and on the other side to the gripper, such that upon rotation of the relevant third drive shaft the block is displaced in the longitudinal direction while displacing the spring element, enabling the gripper to be pulled from the open position into a closed position and vice versa.

42. A manipulator according to claim 32, further comprising a foot plate rotatably connected by a bearing to a lower end of the foot and including a plurality of sliding contacts to provide electrical contact between the motors, a power supply, and a control unit.

43. A manipulator according to claim 42, wherein the bearing for the foot plate comprises an annular groove in an outer surface of the foot plate and a corresponding annular groove on an inner surface of a tube of the foot, both grooves having a substantially V-shaped section such that the two grooves together define a ball track of a substantially rectangular-shaped section, a series of balls being provided in the ball track.

44. A manipulator according to claim 43, wherein an opening is provided in the tube, said opening ending in the ball track and having a passage with a width approximately equal to a diameter of the balls, a stop being provided for closing said opening after insertion of the balls.

45. A manipulator according to claim 32, wherein the foot is formed from a substantially tubular extrusion section, recesses being provided in the foot to receive the motors.

46. A manipulator according to claim 32, wherein spaces are provided in the foot for accommodating spring members for the eccentrics and electronic components.

47. Use of a manipulator according to claim 32 in a space unsuitable for human entry.

48. A manipulator according to claim 32, wherein at least one of the upper and lower arms are rotatable at least 360° about an axis.

49. A manipulator comprising a foot part and a number of members connected to the foot part and to each other respectively, and at least a gripper, such that the members and the gripper constitute, with the foot part, an arm, wherein drive means, comprising motors for moving at least a number of the members and the gripper are provided in the foot part wherein a first member, comprising an upper arm, is rotatable at least 360° about a shoulder axis relative to the foot part and a second member, comprising a lower arm, is rotatable about an elbow axis relative to the first member, wherein compensating means being provided in the foot part for the first and second member which, upon rotational movement of the members, at least partially compensate for the moment exerted by the first member relative to the foot part and by the second member relative to the elbow axis, the arrangement being such that thus, during use, couples acting on a number of drive means are limited;

wherein at least the first member is at least partially hollow, a series of first drive shafts extending from the foot part into the first member, a series of second drive shafts being provided in the second member, said drive shafts being fitted coaxially one within the other, while between the shafts, a number of bearing means are included or formed, a number of the first shafts at the end remote from the foot part being provided with a first drive wheel, while a number of the second shafts are provided with a second drive wheel, a first drive wheel in each case being drivingly connected, via a coupling element, to a second drive wheel, the drive means in the foot part being arranged for driving the respective first drive shafts, the arrangement being such that both the first member and the second member are movable via the first drive shafts;

wherein the second member comprises a series of third shafts, whose longitudinal direction extends approximately at right angles to the longitudinal direction of the second shafts, a number of the second and third shafts being provided with mating, preferably frusto-conical gears for transmitting rotational movements of the relevant second shafts to the relevant third shafts, at least a number of the third shafts being connected to a third member comprising a wrist, movably connected to the end of the second member remote from the first member; and wherein the gripper is provided on the side of the wrist just remote from the first member and is biased in an open position, while a spring element extends through the wrist, on one side connected to a block slidable in longitudinal direction of the first member through rotation of one of the third shafts, and on the other side connected to the gripper, such that upon rotation of the relevant third shaft, the block is displaced in longitudinal direction while displacing the spring element and/or changing the length thereof, enabling the gripper to be pulled from the open position into a closed position and vice versa.

50. A manipulator according to claim 49, wherein the shoulder axis and the elbow axis, during use, extend substantially parallel to each other and preferably horizontally, and are located adjacent opposite ends of the first member, the gripper being rotatable about at least a first gripper axis relative to the second member, said first gripper axis preferably enclosing an angle of about 90° with the elbow axis.

51. A manipulator according to claim 49, wherein the spring means comprise a first and a second compression or tension spring which are at least substantially accommodated in the foot part, with a first and a second band-shaped element respectively extending from the springs over the first and second eccentric respectively, the end distal from the relevant spring being fixed in position, the arrangement being such that upon rotation of an eccentric by means of the relevant rotary shaft, the relevant spring changes in length.

52. A manipulator according to claim 49, comprising a gripper connected to the upper arm, wherein the drive means, in particular motors for moving the upper arm, lower arm and gripper are provided in the foot part.

53. A manipulator according to claim 52, wherein a third member is provided, to be referred to as a wrist, included between the second member and the gripper, drive means for the wrist being included in the foot part.

54. A manipulator according to claim 49, wherein the drive means comprise a series of motors, each motor being coupled to a reduction casing aligned therewith, the reduction casing being connected to a drive wheel connected, via transmission means, to one of a number of drive shafts, included in or adjacent a shoulder, of parts to be driven, in particular the members such as upper arm, lower arm, wrist or gripper.

55. A manipulator according to claim 54, wherein a number of reduction cases are mutually identical, each connected to a drive shaft mounting the relevant drive wheel, the assemblies of reduction casing and drive wheel differing from each other only by the position of the drive wheel relative to the relevant motor.

56. A manipulator according to claim 49, wherein the foot part comprises a foot plate which, by means of a bearing, is rotatably connected thereto adjacent the lower end of the foot part, a number of sliding contacts being provided for transmitting an electric tension between the drive means and a power supply located outside the foot part, and a control unit.

57. A manipulator according to claim 56, wherein the bearing for the foot plate comprises an annular groove in the outer circumference of the foot plate and a corresponding annular groove on an inner surface of a tube of the foot part, the relevant outer circumference of the foot plate being substantially identical to the relevant inner circumference of the tube and both grooves having a substantially V-shaped section, such that the two grooves together define a ball track of a substantially rectangular, in particular square or diamond-shaped section which includes a series of balls whose describing line corresponds to said section of the ball track.

58. A manipulator according to claim 57, wherein an opening is provided in the tube, said opening ending in the ball track and having a passage which is approximately equal to the cross section of the balls, closing means being provided for closing said opening after insertion of the balls.

59. A manipulator according to claim 49, wherein the foot part is substantially formed from a substantially tubular extrusion section, recesses being provided for the drive means.

60. A manipulator according to claim 49, wherein spaces are provided in the foot part for accommodating spring means for compensating means and electronic components.

61. Use of a manipulator according to claim 49 in a space unsuitable for human entry, such as a radiation space or a toxic space.

62. A manipulator according to claim 49, wherein the lower arm is rotatable at least 360° about the elbow axis.

* * * * *